United States Patent [19]

Bruenemann et al.

[11] 3,972,849
[45] Aug. 3, 1976

[54] PRODUCTION OF RESINS

[75] Inventors: Hilmar Bruenemann, Ludwigshafen; Guenter Stoeckelmann; Volker Radtke, both of Frankenthal, all of Germany

[73] Assignee: BASF Aktiengesellschaft, Ludwigshafen (Rhine), Germany

[22] Filed: Apr. 3, 1974

[21] Appl. No.: 457,409

[30] Foreign Application Priority Data
May 5, 1973 Germany............................ 2322741

[52] U.S. Cl............................ 260/37 P; 260/95 R; 260/861; 264/349
[51] Int. Cl.². ........................................... C08J 3/12
[58] Field of Search ................ 260/37 P, 861, 95 R; 264/349

[56] References Cited
UNITED STATES PATENTS

| | | | |
|---|---|---|---|
| 2,277,393 | 3/1942 | Depeu............................ | 260/37 P X |
| 2,715,117 | 8/1955 | Baeyaert......................... | 260/95 R X |
| 2,779,752 | 1/1957 | Vining............................ | 260/95 R X |
| 3,453,221 | 7/1969 | Richart........................... | 260/95 R X |
| 3,462,514 | 8/1969 | Kurkowski et al................. | 260/861 |

OTHER PUBLICATIONS

H. R. Simonds, Ed., Encyclopedia of Plastics Equipment, 1964, pp. 34–35.

Primary Examiner—Donald E. Czaja
Assistant Examiner—S. M. Person
Attorney, Agent, or Firm—Johnston, Keil, Thompson & Shurtleff

[57] ABSTRACT

A process for the production of milled particulate resins which comprises carrying out the reaction of the resin components in a moving reaction vessel containing carrier bodies. The new process is particularly suitable for the production of pigmented resins, for example daylight fluorescent pigments.

8 Claims, 1 Drawing Figure

U.S. Patent   Aug. 3, 1976   3,972,849
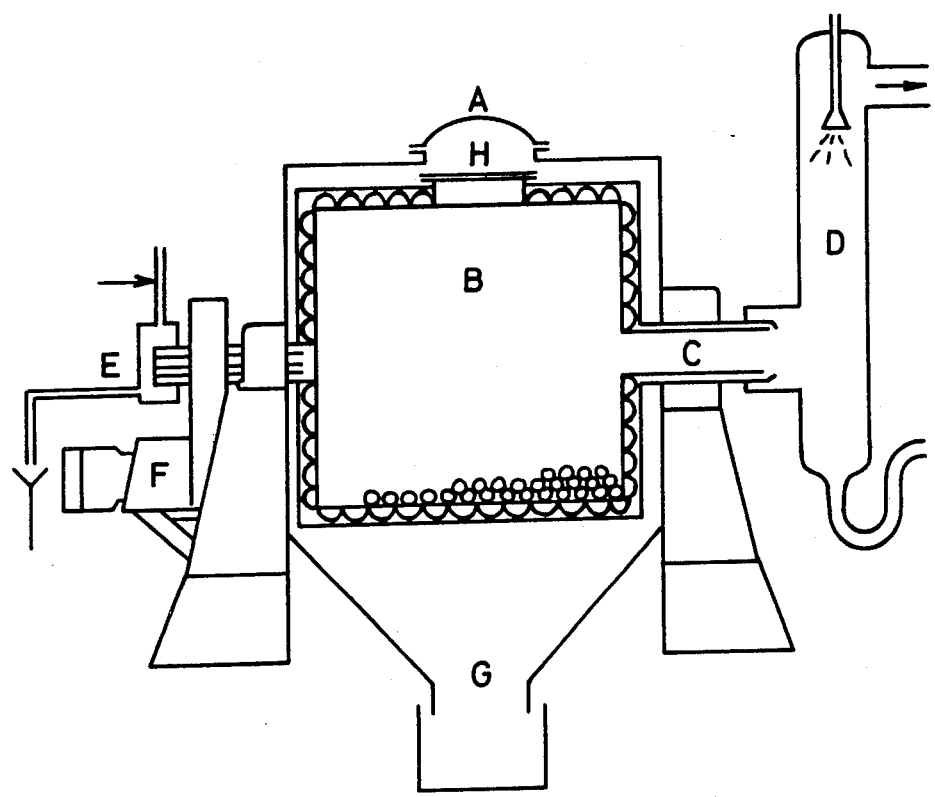

PRODUCTION OF RESINS

This application discloses and claims subject matter described in German Pat. applications Nos. P 23 16 300.0 and P 23 22 741.0 filed Mar. 31, 1973 and May 5, 1973, which are incorporated herein by reference.

The present invention relates to a process for the production of milled particulate resins which comprises carrying out the reaction of the resin components in a moving reaction vessel containing carrier bodies.

Particularly suitable resins are products which are inelastic, non-fiber-forming and brittle and which consequently may easily be converted into particulate form. The resins should moreover have a relatively high softening point, preferably of more than about 100°C, because otherwise at the temperatures which arise during milling the particles of resin may agglomerate and stick together. The resins should also have little or no solubility in the solvents conventionally used in processing such as painters' naphtha, toluene and xylenes and also should not swell in these solvents. Furthermore, the resins should exhibit good transparency and adequate fastness to light. Resins meeting these requirements are generally known.

Examples of particulate resins which may be prepared by the new process include:

a. crosslinked polyester resins from aromatic polycarboxylic acids or their anhydrides, particularly aromatic dicarboxylic and tricarboxylic acids such as phthalic acid, isophthalic acid or trimellitic acid and bifunctional or polyfunctional alcohols such as ethylene glycol, glycerol, pentaerythritol, trimethylolpropane and neopentyl glycol (see for example German Pat. No. 961,575);

b. unplasticized, unmodified acid amide-formaldehyde resins, for example urea-formaldehyde resins (see for example U.S. Pat. No. 2,498,592);

c. unplasticized, alcohol-modified acid-amide-formaldehyde resins, for example urea formaldehyde resins modified with butyl alcohol (see for example U.S. Pat. No. 2,498,592);

d. unplasticized, unmodified aminotriazine-formaldehyde resins (see British Pat. Nos. 754,181 and 748,484);

e. unplasticized, alcohol-modified aminotriazine-formaldehyde resins (British Pat. No. 734,181);

f. arylsulfonamide-acid amide-formaldehyde resins, particularly suitable arylsulfonamides being o-toluenesulfonamide and/or p-toluenesulfonamide, benzenesulfonamide and their alkyl derivatives and their mixtures, and particularly suitable acid amides being urea, thiourea, dicyanodiamide, guanidine, malonic diamide, biuret and succinimide (see British Pat. No. 792,616);

g. arylmonosulfonamide-aminotriazine-formaldehyde resins, particularly suitable arylsulfonamides being the compounds specified under (f), and examples of particularly suitable aminotriazines being 2,4-diamino-1,3,5-triazine, 2,4-diamino-6-methyl-1,3,5-triazine, 2,4-diamino-6-(3-hydroxybutyl)-1,3,5-triazine, 2,4-diamino-6-heptyl-1,3,5-triazine, 2,4-diamino-6-phenyl-1,3,5-triazine, 2,4-diamino-6-benzyl-1,3,5-triazine, 2,4,6-triamino-1,3,5-triazine (melamine), 2,4-diamino-6-($\beta$-cyanoethyl)-1,3,5-triazine and 2,4-diamino-6-($\omega$-cyanovalero)-1,3,5-triazine as well as mixtures of the same;

h. alkylsulfonamide-diisocyanate resins, aralkylsulfonamide-diisocyanate resins or arylsulfonamide-diisocyanate resins according to German printed Application (DAS) No. 2,013,393;

i. polyol-diisocyanate resins according to German Laid-Open Specification (DOS)No. 2,063,948; and j. resins which can be prepared according to German Laid-Open Specifications (DOS) Nos. 2,055,448, 2,055,449, 2,102,942, 2,104,716, 2,104,717, 2,104,718 or 2,104,719.

Examples of suitable reaction vessels for the process according to the invention are vibrating mills, tube mills and tumbling mills, particularly of the type shown in the drawing:

The reaction components are introduced through apertures A and H into the chamber B in which the carrier bodies are present. After the apertures have been closed, the chamber B is set in motion by means of a drive F. The chamber B may be heated with a heat carrier via E. Water formed during the reaction is vaporized and is condensed with other volatile substances in a scrubber D. After the reaction is over the apertures H is opened and the product is removed through discharge opening G.

The reaction may be carried out at superatmospheric or subatmospheric pressure using appropriate additional equipment.

The carrier bodies may be a grinding medium of any shape, preferably in the form of spheres, rods or cones which can be moved relative to a heated surface and which are inert to the reactants under the reaction conditions.

The carrier bodies may be made for example of steel, ceramic material, non-ferrous metal or in special cases of plastics material.

Examples of specific materials, in addition to steel, are copper, silicon carbide, porcelain, quartz and particularly aluminum oxide.

It is preferred to use spherical carrier bodies.

The ratio of the amount of the resin components (M in g) charged into the mill to the surface area of the carrier bodies (O in cm$^2$) which should conform to the following relationship: $(M/O) \leq (1/5)\,d$ where $d$ is the mean diameter in cm of a carrier body, is of particular importance for the new process.

When the value of $(M/O)$ is more than $(1/5)\,d$, there is a risk of agglomeration of the contents of the reaction vessel, so that both further mixing and equalization of the temperature are prevented.

The degree to which the reaction vessel is filled is advantageously within the range from 10 to 80% and preferably from 20 to 60% of its volume. The reaction temperature depends on the type of resin to be prepared and, as a rule, is within the range from 100° to 200°C and preferably from 140° to 180°C.

The process according to the invention is particularly suitable for the production of colored resins, for example of daylight fluorescent pigments. The dyes used for the coloration of the resins which takes place simultaneously with the formation of the resins may be compounds conventionally used for this purpose; examples are dyes of the benzoxanthene, benzothioxanthene, benzofuran, coumarin or naphthalene series. Examples of particularly significant compounds are rhodamine dyes (rhodamine B) and compounds of the formula:-

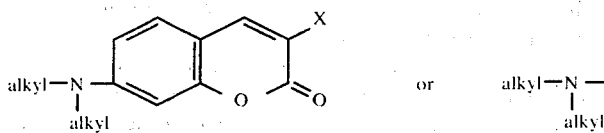

where X is a nitrogen heterocycle.

The novel process is advantageously carried out by introducing a mixture of the resin components and, if desired, the dye and/or an optical brightener into the reaction vessel and heating them to the reaction temperature, the reaction vessel being kept in constant motion and preferably being rotated. A film of resin forms on the carrier bodies and as long as the composition remains liquid this film is renewed continuously and complete homogenization of the reaction mixture is thus made possible.

After the reaction is over, the resin is coverted into a brittle state if necessary by cooling. The resin film is thus caused to break away from the carrier bodies; the carrier bodies then act as grinding media and produce a particulate product.

In the case of a rotating reaction vessel it is recommended that a relatively high speed should be used at first in order to effect mixing, that the speed should be decreased as the reaction proceeds and that finally the speed should be increased again for milling. The speed is usually within the range of from 10 to 100% of the usual critical speeds for ball mills.

German Laid-Open Specification (DOS) No. 1,520,948 discloses a process for the production of resins in which the resin components (melamine, toluenesulfonamide and p-formaldehyde) are applied in the form of a thin layer (not more than 5.4 g/cm$^2$) to sheet metal and condensed by heating. Apart from the fact that it is difficult to control the temperature and impossible to mix the components on sheet metal, the process has the disadvantage that the resin can only be removed from the sheet metal at great expense and the sheet metal can only be used a few times because cleaning is uneconomical.

By contrast, the course of the reaction and the mixing operation in the novel process can be optimized very simply and in particular the product is obtained direct in a ready-to-use form. It is not necessary to clean the reaction vessel.

Further treatment of the resin, for example finishing, may be carried out before it is discharged.

The invention is further illustrated by the following Examples in which parts and percentages are by weight unless otherwise stated.

EXAMPLE 1

An apparatus as shown in the drawing is used; the chamber has a volume of 300 liters and is filled with spherical aluminum oxide carrier bodies having a surface area of 73,000 cm$^2$ and a diameter of 5 cm. 14.63 parts of a mixture of o-toluenesulfonamide and p-toluenesulfonamide, 4.27 parts of paraformaldehyde, 4.8 parts of melamine and 0.56 part of rhodamine 6G (C.I. 45,160) are introduced cold into the chamber and heated at 170°C for ninety minutes, the mill speed being 7 r.p.m. The whole is then cooled to 130°C and milled for half an hour at 25 r.p.m. 20.0 parts of a crude milled pigment having good fastness properties is obtained.

EXAMPLE 2

The same apparatus as in Example 1 is used. 29.25 parts of toluenesulfonamide, 7.76 parts of paraformaldehyde, 9.6 parts of melamine, 0.26 part of rhodamine 6G (C.I. 45,160) and 0.862 part of rhodamine 3B extra (C.I. 45,175) are introduced into the apparatus which has been preheated to 170°C and which is then rotated for fifteen minutes at 20 r.p.m. and for seventy-five minutes at 7 r.p.m. 42 parts of a milled product of good quality is obtained after cooling to 100°C.

EXAMPLE 3

The procedure of Example 1 is repeated, but the 4.27 parts of paraformaldehyde is replaced by 9.4 parts of a 40% formalin solution. 20 parts of a milled pigment is obtained which is practically identical with that of Example 1.

EXAMPLE 4

An apparatus as shown in the drawing is used; the chamber has a volume of 1500 liters and is filled with about 3000 spherical aluminum oxide carrier bodies (diameter 60 mm). 68.4 parts of a mixture of o-toluenesulfonamide and p-toluenesulfonamide, 20.8 parts of melamine, 38.8 parts of paraformaldehyde, 2 parts of rhodamine B (C.I. 45,170) and 0.6 part of rhodamine 6G (C.I. 45,160; methyl ester) are introduced into the chamber which has been preheated to 80°C. The whole is heated at 170° to 175°C for about two hours. The chamber is rotated at 16 r.p.m. during the heating-up phase and at 4 r.p.m. thereafter. After the resin has been fully condensed, it is cooled to 100°C, milled at 24 r.p.m. and discharged. 110 parts of a bluish red powder is obtained which is outstandingly suitable for pigment printing.

EXAMPLE 5

34.2 parts of a mixture of o-toluenesulfonamide and p-toluenesulfonamide, 10.4 parts of melamine, 19.4 parts of paraformaldehyde, 0.5 part of rhodamine B (C.I. 45,170) and 0.15 part of rhodamine 6G (C.I. 45,160; methyl ester) are introduced into the cold chamber of the apparatus according to Example 4. The whole is heated to 180°C at 20 r.p.m. and further treated for two hours at 4 r.p.m. After cooling to 120°C and milling at 24 r.p.m. 54 parts of a bluish red powder is obtained which is highly suitable for coloring polyvinyl chloride.

EXAMPLE 6

The apparatus used in Example 4 is preheated to 140°C and charged with 102.6 parts of a mixture of o-toluenesulfonamide and p-toluenesulfonamide, 31.2 parts of melamine, 58.2 parts of paraformaldehyde and 3 parts of the dye of the formula:

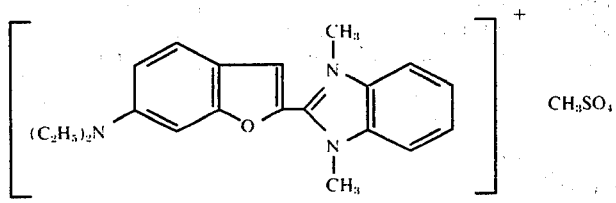

The whole is heated to 175°C at 16 r.p.m. and further treated for two hours at 6 r.p.m. After cooling to 100°C and milling at 24 r.p.m. the product is discharged. 159 parts of a finely divided powder is obtained which gives brilliant greenish yellow coatings when incorporated into surface coating materials.

EXAMPLE 7

The apparatus used is as described in Example 4. 34.2 parts of a mixture of o-toluenesulfonamide and p-toluenesulfonamide, 10.4 parts of melamine, 19.4 parts of paraformaldehyde and 1.4 parts of the dye of the formula:

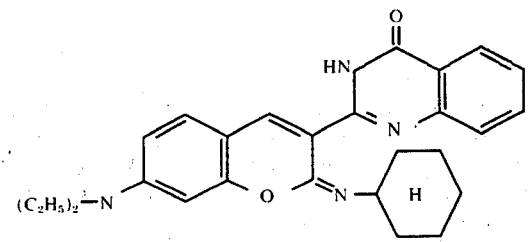

are introduced into the chamber preheated to 80°C. While the chamber is rotated at 20 r.p.m., the whole is heated to 170°C and then condensation is carried out for two hours at 4 r.p.m. After cooling to room temperature, milling is effected at 24 r.p.m. and the product is then discharged. 55 parts of a finely divided yellow powder is obtained which exhibits very good fastness properties in textile and non-textile fields of application.

EXAMPLE 8

The apparatus used is as described in Example 4. 68.4 parts of a mixture of o-toluenesulfonamide and p-toluenesulfonamide, 20.8 parts of melamine, 38.8 parts of paraformaldehyde and 2 parts of rhodamine 6G (C.I. 45,160; methyl ester) are introduced into the chamber which has been preheated to 170°C. The chamber is rotated for fifteen minutes at 16 r.p.m. and then for ninety minutes at 6 r.p.m. After cooling and milling the product is discharged. 112 parts of a brilliant yellowish red powder is obtained.

EXAMPLE 9

A mixture of 2.1 parts of the dye of the formula:

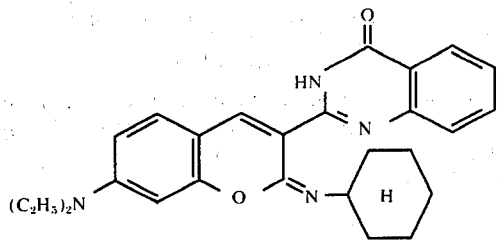

1.3 parts of rhodamine 6G (C.I. 45,160; methyl ester), 34.3 parts of a mixture of o-toluenesulfonamide and p-toluenesulfonamide, 10.4 parts of melamine and 19.4 parts of paraformaldehyde is introduced into the apparatus described in Example 4. The chamber is heated to 180°C at 15 r.p.m. and then condensation is effected for two hours at 4 r.p.m. After cooling and milling at 24 r.p.m. the product is discharged. 55 parts of a brilliant orange powder is obtained which is very suitable for textile printing.

EXAMPLE 10

The apparatus described in Example 4 is charged with 102.6 parts of a mixture of o-toluenesulfonamide and p-toluenesulfonamide, 31.2 parts of melamine, 58.2 parts of paraformaldehyde, 6 parts of the dye of the formula:

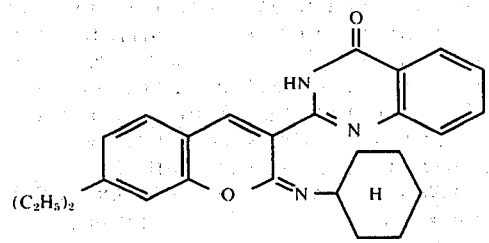

and 6 parts of rhodamine 6G (C.I. 45,160; methyl ester). The whole is heated to 180°C at 20 r.p.m. and then condensed for ninety minutes at 6 r.p.m. After cooling and milling, the product is discharged. 160 parts of a yellowish red powder of very good quality is obtained.

EXAMPLE 11

The apparatus and substances used are the same as in Example 4 but 2.2 parts of Azosol Brilliant Yellow 6 GF (C.I. 56,200) is used instead of the rhodamine mixture. 111 parts of a greenish yellow powder is obtained.

EXAMPLE 12

The apparatus and substances described in Example 4 are used except that 3 parts of the dye of the formula:

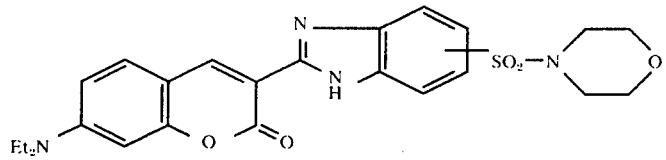

is substituted for the rhodamine mixture. 110 parts of a particulate greenish yellow resin is obtained.

EXAMPLE 13

The apparatus and substances used are the same as in Example 4 except that 1.8 parts of the dye of the formula:

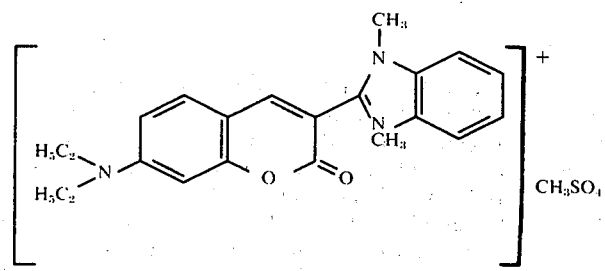

is substituted for the rhodamine mixture. 110 parts of a greenish yellow resin is obtained in the form of a fine powder.

EXAMPLE 14

The apparatus used is a 10-liter laboratory apparatus (a cylindrical enamelled or stainless steel vessel which contains carrier bodies and into the cover of which there projects a tube having a length of 15 cm and a diameter of 4 cm, rotating on a horizontal axis in an oilbath or airbath); the carrier bodies used are five steel balls having a diameter of 5 cm, four steel balls having a diameter of 4 cm and six steel balls having a diameter of 2 cm. The vessel is charged at room temperature with a mixture of 171 parts of a mixture of o-toluenesulfonamide and p-toluenesulfonamide, 52 parts of melamine, 97 parts of paraformaldehyde, 5 parts of rhodamine B (C.I. 45,170), 1 part of rhodamine 6G (C.I. 45,160; methyl ester) and 3 parts of Azosol Brilliant Yellow 6 GF (C.I. 56,200). The whole is heated to from 170° to 175°C at 60 r.p.m., kept at this temperature for ninety minutes at 18 r.p.m. and then cooled. After milling at 60 r.p.m., 276 parts of a finely divided red powder is obtained.

EXAMPLE 15

The apparatus described in Example 14 is charged with 86 parts of a mixture of o-toluenesulfonamide and p-toluenesulfonamide, 180 parts of 3-isocyanatomethyl-3,5,5-trimethylcyclohexyl isocyanate (isophorone diisocyanate), 25 parts of melamine and 2.5 parts of rhodamine 6G (C.I. 45,160; methyl ester). The whole is heated, with rapid rotation of the reaction vessel, to 160°C where the reaction starts exothermally. The temperature is then raised to 180° to 190°C and the vessel is rotated for one hour at 6 r.p.m. After cooling to room temperature milling is carried out at 20 r.p.m. after which 270 parts of a finely divided bluish red powder is obtained.

EXAMPLE 16

The apparatus used is that described in Example 14. It is charged with 77 parts of a mixture of o-toluenesulfonamide and p-toluenesulfonamide, 45 parts of melamine, 151 parts of trimethylhexamethylene diisocyanate, 22.5 parts of the dye used in Example 13, 2.5 parts of rhodamine B (C.I. 45,170) and 6.5 parts of rhodamine 6G (C.I. 45,160; methyl ester). While rotating the vessel rapidly it is heated to 155° to 160°C, kept for one hour at this temperature and a lower speed, cooled to 80°C and the product is milled to yield a reddish orange powder.

EXAMPLE 17

The apparatus used is that described in Example 14. It is charged with 60 parts of melamine, 45 parts of 2,3-butanediol, 240 parts of 3-isocyantomethyl-3,5,5-trimethylcyclohexyl isocyanate, 1 part of the dye used in Example 13 and 5.2 parts of rhodamine B. The whole is heated to 150°C with rapid rotation of the vessel, kept at this temperature for ninety minutes at about 16 r.p.m. and the product is cooled and milled. A finely divided red powder is obtained.

EXAMPLE 18

The apparatus used is that described in Example 14. It is charged with 100 parts of 2,4-diamino-6-phenyl-s-triazine, 48.5 parts of 1,4-butanediol, 203 parts of trimethylhexamethylene diisocyanate, 2.2 parts of the dye used in Example 13 and 3.2 parts of rhodamine 6G (C.I. 45,160; methyl ester). After rapid heating to 130°C the temperature is slowly raised to 150°C and kept constant for ninety minutes while the vessel is slowly rotated. The product is then cooled and milled. A finely divided reddish orange powder is obtained.

The following resins are prepared according to the procedure described in Example 15:

| Ex. | Resin components used | Dye | Time | Condensation temperature | Color of the pigment |
|---|---|---|---|---|---|
| 19 | 85.5 parts of o/p-toluenesulfonamides<br>105 parts of trimethylhexamethylene diisocyanate | 1.5 parts of rhodamine B | 2 h | 150°–160°C | bluish red |
| 20 | 85 parts of o/p-toluenesulfonamides<br>111 parts of isophorone diisocyanate | 1.5 parts of rhodamine B | 1 h | 160°C | bluish red |
| 21 | 43 parts of o/p-toluenesulfonamides<br>28 parts of 2,4-diamino-6-phenyl-s-triazine<br>84 parts of trimethylhexamethylene diisocyanate | 5 parts of Azosol Brilliant Yellow | 1 h | 175°C | greenish yellow |
| 22 | 43 parts of o/p-toluenesulfonamides<br>13 parts of melamine<br>90 parts of isophorone diisocyanate | 2.5 parts of the dye of Example 13 | 1 h | 180°–190°C | greenish yellow |
| 23 | 49.5 parts of hydroquinone-bis-2-hydroxyethyl ether<br>55.5 parts of isophorone diisocyanate | 1.2 parts of the dye of Example 13 | 2 h | 150°C | greenish yellow |
| 24 | 47 parts of 2,4-diamino-6-phenyl-s-triazine<br>13.5 parts of pentaerythritol<br>89 parts of isophorone diisocyanate | 3.5 parts of Azosol Brilliant Yellow; 2.5 parts of rhodamine B | 2 h | 150°C | orange |
| 25 | 38 parts of melamine<br>26 parts of 2,2-dimethylpropanediol-1,3<br>118 parts of dicyclohexylmethane-4,4'-diisocyanate | 3 parts of rhodamine B; 1.2 parts of the dye of Example 13 | 1.5 h | 160°C | red |

EXAMPLE 26

The apparatus used is that described in Example 14 but the steel balls are replaced by spheres of aluminum oxide. A mixture of 264 parts of phthalic anhydride, 118 parts of pentaerythritol and 3.5 parts of rhodamine B is heated to 160°C with rapid rotation of the vessel. After a reaction period of two hours the whole is heated to 180°C and kept at this temperature for another ninety minutes. The product is cooled to room temperature, and milled. A finely powdered bluish red resin is obtained.

EXAMPLE 27

The apparatus and substances used are the same as in Example 26 but the phthalic anhydride is replaced by 180 parts of succinic anhydride. After further treatment for four hours at 150° to 160°C a bluish red powder of similar quality to that in Example 26 is obtained.

EXAMPLE 28

The apparatus used is the same as in Example 14, the carrier bodies being twelve aluminum oxide spheres (six 5 cm in diameter and the other six 4 cm in diameter). The charge consisting of 85.5 parts of a mixture of o-toluenesulfonamide and p-toluenesulfonamide, 48 parts of paraformaldehyde, 50 parts of urea, 1.5 parts of rhodamine B and 1.2 parts of rhodamine 6G (C.I. 45,160; methyl ester) is melted while rotating the vessel rapidly and further treatment is effected for one hour at a low speed. After cooling and milling a brilliant bluish red powder is obtained.

EXAMPLE 29

The apparatus used is the same as in Example 28. It is charged with 103 parts of a mixture of o-toluenesulfonamide and p-toluenesulfonamide, 60 parts of paraformaldehyde, 25 parts of dicyanodiamide, 4 parts of Azosol Brilliant Yellow 6GF and 2 parts of rhodamine 6G (C.I. 45,160; methyl ester). The mixture is melted at 120°C while rapidly rotating the vessel, the temperature is raised to 170°C and further treatment is effected for two hours. After cooling and milling a particulate reddish orange resin is obtained.

EXAMPLE 30

The apparatus used is the same as in Example 28. It is charged with 171 parts of a mixture of o-toluenesulfonamide and p-toluenesulfonamide, 88 parts of formaldehyde, 53 parts of melamine and 7.5 parts of the dye of the formula:

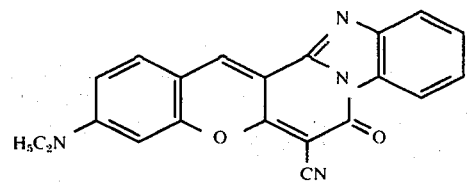

Condensation is carried out as usual at from 170° to 175°C for two hours. A brilliant red resin powder is obtained.

EXAMPLE 31

The apparatus used is the same as in Example 28. It is charged with 171 parts of a mixture of o-toluenesulfonamide and p-toluenesulfonamide, 99 parts of paraformaldehyde, 92 parts of 2,4-diamino-6-phenyl-s-triazine and 5.5 parts of rhodamine B. The whole is heated up to 160° to 170°C while rapidly rotating the vessel and further treatment is effected for two hours and a half. After cooling and milling a bluish red powder is obtained.

EXAMPLE 32

The substances and apparatus used are the same as in Example 31 but 2,4-diamino-6-phenyl-s-triazine is replaced by 2,4-diamino-s-triazine (48 parts). Further treatment is carried out as described above. A product of comparable quality is obtained.

EXAMPLE 33

The substances and apparatus used are the same as in Example 31 but 2,4-diamino-6-phenyl-s-triazine is replaced by 2,4-diamino-6-methyl-s-triazine (60 parts). Further treatment is carried out as in Example 31. A bluish red powder of good quality is again obtained.

EXAMPLE 34

The substances are the same as in Example 31 except that 2.4-diamino-6-phenyl-s-triazine is replaced by 2,4-diamino-6-benzyl-s-triazine (87 parts). Further treatment is carried out as in Example 31. The finished resin again has good fastness properties.

EXAMPLE 35

The apparatus used is the same as in Example 14. It is charged with 50 parts of a mixture of o-toluene sulfonamide and p-toluenesulfonamide, 30 parts of melamine, 90 parts of paraformaldehyde, 150 parts of a solid polyester polyol based on phthalic anhydride, trimethylolpropane and ethylene glycol (OH number about 260), and 5 parts of the dye of the formula:

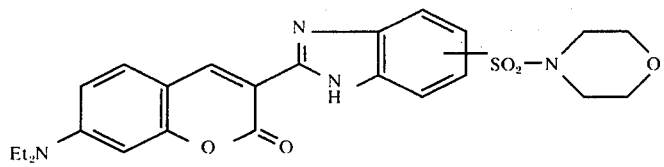

The whole is melted while rotating the vessel rapidly at 120° to 130°C, the temperature is raised to 160°C and further treatment is effected for two hours at a lower speed. After cooling and milling a brilliant yellow powder is obtained which exhibits good fastness properties in pigment printing.

EXAMPLE 36

The apparatus and substances used ae the same as in Example 35 except that the yellow dye is replaced by the same amount of rhodamine B. A brilliant red powder of good quality is obtained.

EXAMPLE 37

The apparatus used is as described in Example 14. It is charged with 75 parts of a mixture of o-toluenesulfonamide and p-toluenesulfonamide, 15.0 parts of a solid acrylate resin having a content of hydroxyl groups of about 2%, 52 parts of melamine, 5 parts of rhodamine B, 1.5 parts of rhodamine 6G (C.I. 45,160; methyl ester) and 97 parts of paraformaldehyde. While the vessel is rapidly rotated, the whole is heated to 160°C so that the components melt. Further treatment is effected for two hours at a lower speed. The product is cooled and milled at 24 r.p.m. to give a finely divided red powder.

EXAMPLE 38

The apparatus and charge are the same as in Example 37 but the rhodamine mixture is replaced by 4 parts of Azosol Brilliant Yellow 6GF. Analogously to Example 17 a brilliant greenish yellow resin powder is obtained.

EXAMPLE 39

The laboratory apparatus described in Example 14 is used (10-liter stainless steel vessel; twelve aluminum oxide balls of different sizes as carrier bodies). The tube passing through the cover is not open to the air but is connected by appropriate means to a vacuum pump. With this additional equipment reactions may be carried out in the vessel which proceed with the elimination of reaction products which are scarcely volatile at atmospheric pressure or which proceed at least partially in a solvent. 250 parts of a 50% solution of a butylated urea-formaldehyde resin and 1 part of Azosol Brilliant Yellow 6GF are introduced, heated in a water jet vacuum to 150°C and further treated for 5 hours. After cooling and milling at about 24 r.p.m. a brilliant greenish yellow powder is obtained.

EXAMPLE 40

The vacuum apparatus described in Example 39 is used. It is charged with 250 parts of an aqueous dispersion of a urea-formaldehyde resin (solids content about 50%), 1 part of Azosol Brilliant Yellow 6GF and 0.6 part of rhodamine 6G (C.I. 45,160; methyl ester). After further treatment and milling as in Example 39 a brilliant reddish orange resin powder is obtained.

EXAMPLE 41

The vacuum apparatus described in Example 39 is used. It is charged with 250 parts of a methylated melamine-formaldehyde resin in a mixture of water and methanol, 1.5 parts of rhodamine 6G and 3 parts of p-toluenesulfonic acid. After condensation and milling as in Example 39 a finely divided bluish red powder is obtained.

EXAMPLE 42

The vacuum apparatus described in Example 39 is used. It is charged with 200 parts of a 50% solution of the transesterification product of dimethyl terephthalate and 1,1,1-trimethylolpropane (194 parts of dimethyl terephthalate and 201 parts of 1,1,1-trimethylolpropane heated for five hours at 250°C in the presence of 0.12 part of manganese (II) acetate) in cyclohexanone, 198 parts of DESMODUR N (a polyisocyanate containing biuret and based on hexamethylene-1,6-diisocyanate X; product of Bayer AG, Leverkusen, Germany) and 3 parts of benzothioxanthene-3,4-dicarboxylic acid stearylimide. The whole is heated to 150°C while rotating the vessel rapidly, further treated in vacuo for fifteen hours, cooled and milled. The finished resin powder is greenish yellow.

EXAMPLE 43

The vacuum apparatus described in Example 39 is used. It is charged with 200 parts of a 50% solution of the transesterification product of dimethyl terephthalate and 1,1,1-trimethylolpropane (see Example 42) in a 1:1 mixture of xylene and butanol, 50 parts of phthalic anhydride and 1.95 parts of 7-oxo-14-thiadibenzo-(b,d,e,f)-chrysene. The whole is heated to 150°C while the vessel is rapidly rotated, and further treatment is effected in vacuo for fifteen hours. After cooling and milling a brilliant yellowish red resin powder is obtained.

EXAMPLE 44

The vacuum apparatus described in Example 39 is used. It is charged with 200 parts of a 50% solution of the transesterification product of dimethyl terephthalate and 1,1,1-trimethylolpropane (see Example 42) in a 1:1 mixture of xylene and butanol, 135 parts of a 50% solution of a melamine-formaldehyde resin in butanol (126 parts of melamine and 180 parts of paraformaldehyde in 306 parts of n-butanol heated for three hours at 110° to 120°C), 0.9 part of Azosol Brilliant Yellow 6GF (C.I. 56,200) and 10 parts of adipic acid. Mixing is carried out with rapid rotation of the vessel, the whole is heated to 150°C and further treatment is effected at a lower speed for thirteen hours in vacuo (about 300 mm). The milled product produces a greenish yellow fluorescence.

EXAMPLE 45

The vacuum apparatus described in Example 39 is used. It is filled with 200 parts of an about 50% solution of an acrylate resin containing hydroxyl groups in ethyl glycol acetate (a mixture of 120 parts of methyl methacrylate, 80 parts of hydroxyethyl methacrylate, 2.4 parts of di-tert-butyl peroxide and 4.8 parts of tert-dodecylmercaptan is introduced in the course of five hours into 200 parts of ethyl glycol acetate at 140°C and then further polymerized for one hour), 100 parts of DESMODUR N (a polyisocyanate based on hexamethylene-1,6-diisocyanate and containing biuret - product of Bayer AG, Leverkusen, Germany) and 1 part of 10-methoxybenzoxanthene-3,4-dicarboxylic acid hydrazide. The whole is heated to 150°C while rotating the vessel rapidly and further treatment is effected in a vacuum of 300 mm for 15 hours while slowly rotating the vessel. The reaction product is cooled and milled to give a brilliant greenish yellow powder.

EXAMPLE 46

The vacuum apparatus described in Example 39 is used. It is charged with 200 parts of a 50% solution of an acrylate resin containing hydroxyl groups in ethyl glycol acetate (for production see Example 45), 20 parts of phthalic anhydride and 1.8 parts of Azosol Brilliant Yellow 6GF. After the whole has been heated up to 150°C while rotating the drum rapidly, further treatment is effected for fifteen hours at 300 mm. The whole is then cooled and the brittle resin is milled at about 60 r.p.m. to give a brilliant finely divided greenish yellow powder.

EXAMPLE 47

The vacuum apparatus described in Example 39 is used. It is charged with 240 parts of an about 45% solution of an acrylate resin (a mixture of 28 parts of acrylic acid, 178 parts of methyl methacrylate, 127 parts of hydroxyethyl methacrylate, 90 parts of n-butyl methacrylate, 178 parts of styrene and 7 parts of dibenzoyl peroxide is introduced in the course of two hours into a mixture of 240 parts of n-butanol and 490 parts of p-xylene, the whole is heated to 115° to 120°C, 4 parts of dibenzoyl peroxide is added after 2 hours, 1 part is added after another two hours and after heating under reflux for a total of 6 hours a resin solution is obtained having a solids content of 45%), 160 parts of a 45% solution of a melamine-formaldehyde resin in butanol (504 parts of melamine and 720 parts of paraformaldehyde in 1224 parts of butanol boiled for three hours) and 2.5 parts of 10-methoxybenzoxanthene-3,4-dicarboxylic acid hydroxide. After further treatment and milling as described in Example 46, a brilliant yellowish green powder is obtained.

EXAMPLE 48

The vacuum apparatus described in Example 39 is used. It is charged with 200 parts of an acrylate resin containing epoxide groups, about 50% in ethyl glycol (a mixture of 360 parts of methyl methacrylate, 240 parts of glycidyl methacrylate, 72 parts of di-tert-butyl peroxide and 14.4 parts of tert-dodecylmercaptan is introduced in the course of 5 hours into 600 parts of ethyl glycol at 140°C and stirred for another hour), 26 parts of phthalic anhydride and 0.9 part of 3-oxo-14-thiadibenzo-(b,d,e,f)-chrysene. Further treatment and milling are carried out as in Example 46. The finely divided pigment produces a yellowish red fluorescence.

EXAMPLE 49

The vacuum apparatus described in Example 39 is used. It is charged with 250 parts of an about 60% solution of a copolymer containing acid anhydride in ethyl glycol acetate (240 parts of methyl methacrylate, 160 parts of maleic anhydride, 4.8 parts of di-tert-butyl peroxide and 9.6 parts of tert-dodecylmercaptan are added in the course of 5 hours at 140°C to 400 parts of ethyl glycol acetate and the whole is stirred for another hour), 45.5 parts of 1,1,1-trimethylolpropane and 0.8 part of benzothioxanthene-3,4-dicarboxylic stearylimide. Further treatment is carried out as described in Example 46. After milling at 24 r.p.m. a finely divided yellow powder is obtained.

EXAMPLE 50

136.8 parts of a mixture of o-toluenesulfonamide and p-toluenesulfonamide, 41.6 parts of melamine, 77.6 parts of paraformaldehyde, 4 parts of rhodamine B (C.I. 45,170) and 1.2 parts of rhodamine 6G (C.I. 45,160) are charged into the chamber, preheated to 80°C, of an apparatus according to Example 4.

The whole is heated for about three hours and a half at 170°C at 4 r.p.m. After the resin has been completely condensed, it is cooled to 100°C, milled at 24 r.p.m. and discharged. 205 parts of a red powder is obtained which is outstandingly suitable for pigment printing.

What we claim is:

1. A process for the production of particulate milled resins having melting points of more than about 100°C which comprises:

passing the reaction components of the resin into a moving reaction vessel having an outlet for volatile reaction by-products containing grinding bodies, said grinding bodies occupying from about 20 to 60% of the volume of the reaction vessel, heating said components to their reaction temperature in the presence of said moving grinding bodies within said vessel whereby a liquid film of reactants is formed on the surface of said bodies;

and cooling the formed resin while continuing to move said vessel whereby the resin in a brittle state is caused to break away from said bodies and be milled by said bodies, the ratio of the amount of the resin components (M) in grams to the surface area (O) of the grinding bodies in square centimeters conforms to the relationship:

$(M/O) \leq (1/5)d$ $d$ being the mean diameter of a grinding body in centimeters.

2. A process as claimed in claim 1 wherein a dye is additionally present in the moving reaction vessel for the preparation of a resin pigment with the dye.

3. A process as claimed in claim 2 carried out at subatmospheric pressure.

4. A process as claimed in claim 1 wherein the grinding bodies are spherical.

5. A process as claimed in claim 4 wherein aluminum oxide spheres are used as grinding bodies.

6. A process as claimed in claim 1 wherein the reaction vessel is rotated at a relatively high speed at first to effect mixing, the speed is decreased as the reaction proceeds and finally increased again to effect milling.

7. A process as claimed in claim 1 wherein the resin components comployed are components reacting together to form a cross-linked polyester resin based on an aromatic polycarboxylic acid or anhydride and a polyfunctional alcohol, an unplasticized unmodified or alcohol-modified acid amide/formaldehyde resin, an unplasticised unmodified or alcohol-modified aminotriazine/formaldehyde resin, an arylsulfonamide/acid amide/formaldehyde resin, an arylmonosulfonamide/aminotriazine/formaldehyde resin, and alkyl-, aralkyl- or aryl-sulfonamide/diisocyanate resin or a polyol/diisocyanate resin.

8. A process as claimed in claim 2 wherein the dye present is a rhodamine dye or a dye of the formula

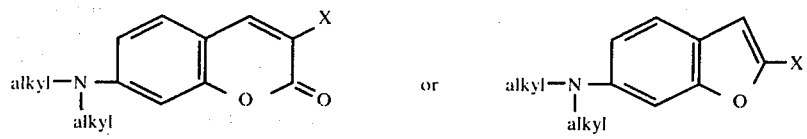

where X is a nitrogen heterocycle.

* * * * *

UNITED STATES PATENT AND TRADEMARK OFFICE
CERTIFICATE OF CORRECTION

PATENT NO. : 3,972,849
DATED : August 3, 1976
INVENTOR(S) : Hilmar Bruenemann et al.

It is certified that error appears in the above-identified patent and that said Letters Patent are hereby corrected as shown below:

In Column 11, Line 35, delete " ... used ae the ... "
and substitute -- ... used are the ... --

In Column 14, Line 3, delete " ... acid hydroxide. ... "
and substitute -- ... acid hydrazide. ... --

In Column 15, Line 3 of Claim 2, delete " ... resin pigment with ... " and substitute -- ... resin pigmented with ... --

Signed and Sealed this

Twenty-fifth Day of October 1977

[SEAL]

Attest:

RUTH C. MASON
Attesting Officer

LUTRELLE F. PARKER
Acting Commissioner of Patents and Trademarks